W. C. EAKIN & R. DEBOO.
FLUSHING TANK.
APPLICATION FILED JULY 29, 1908.
951,758.
Patented Mar. 8, 1910.
2 SHEETS—SHEET 2.
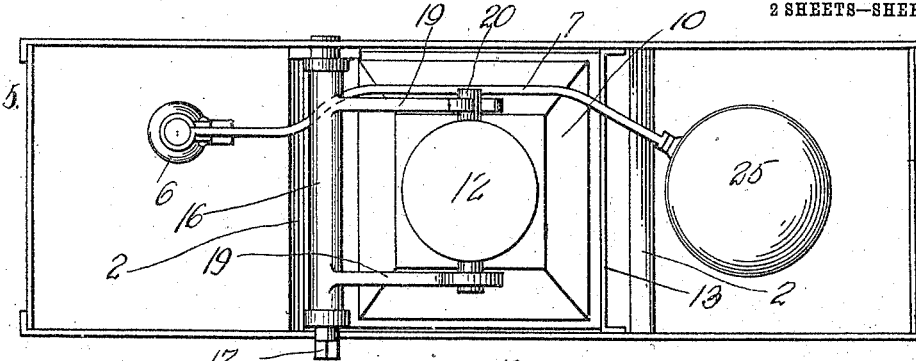
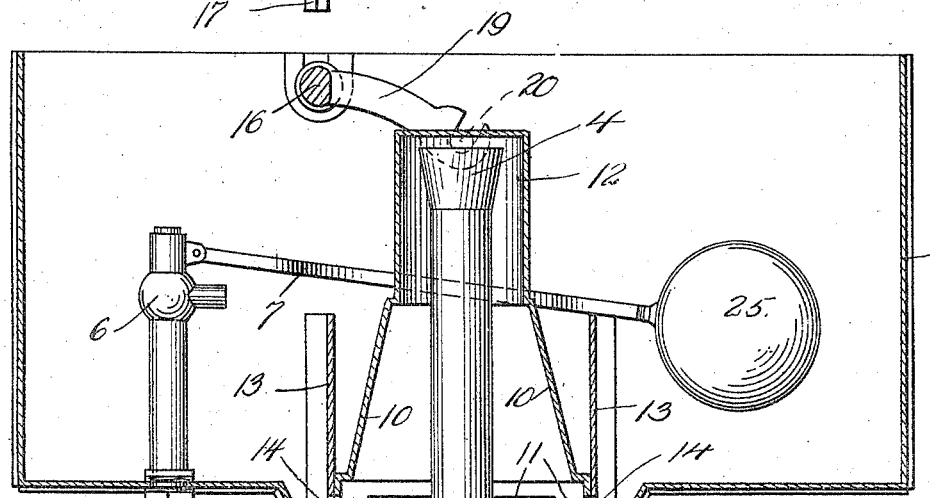
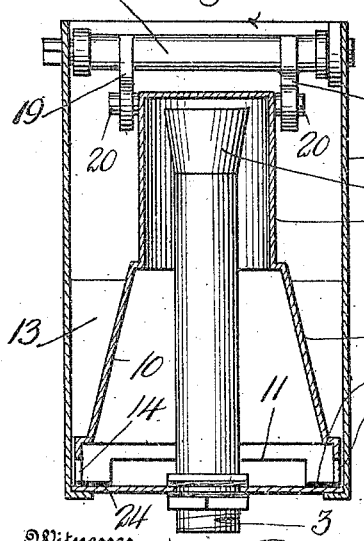
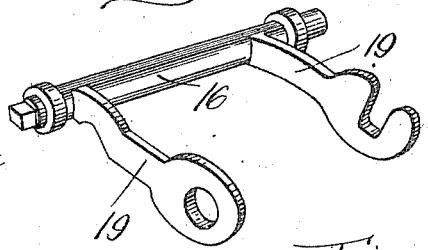
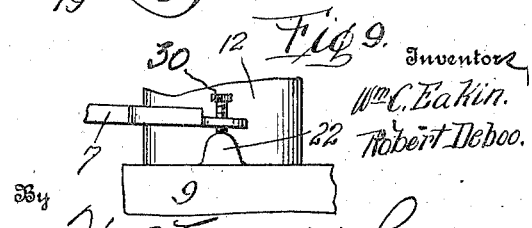

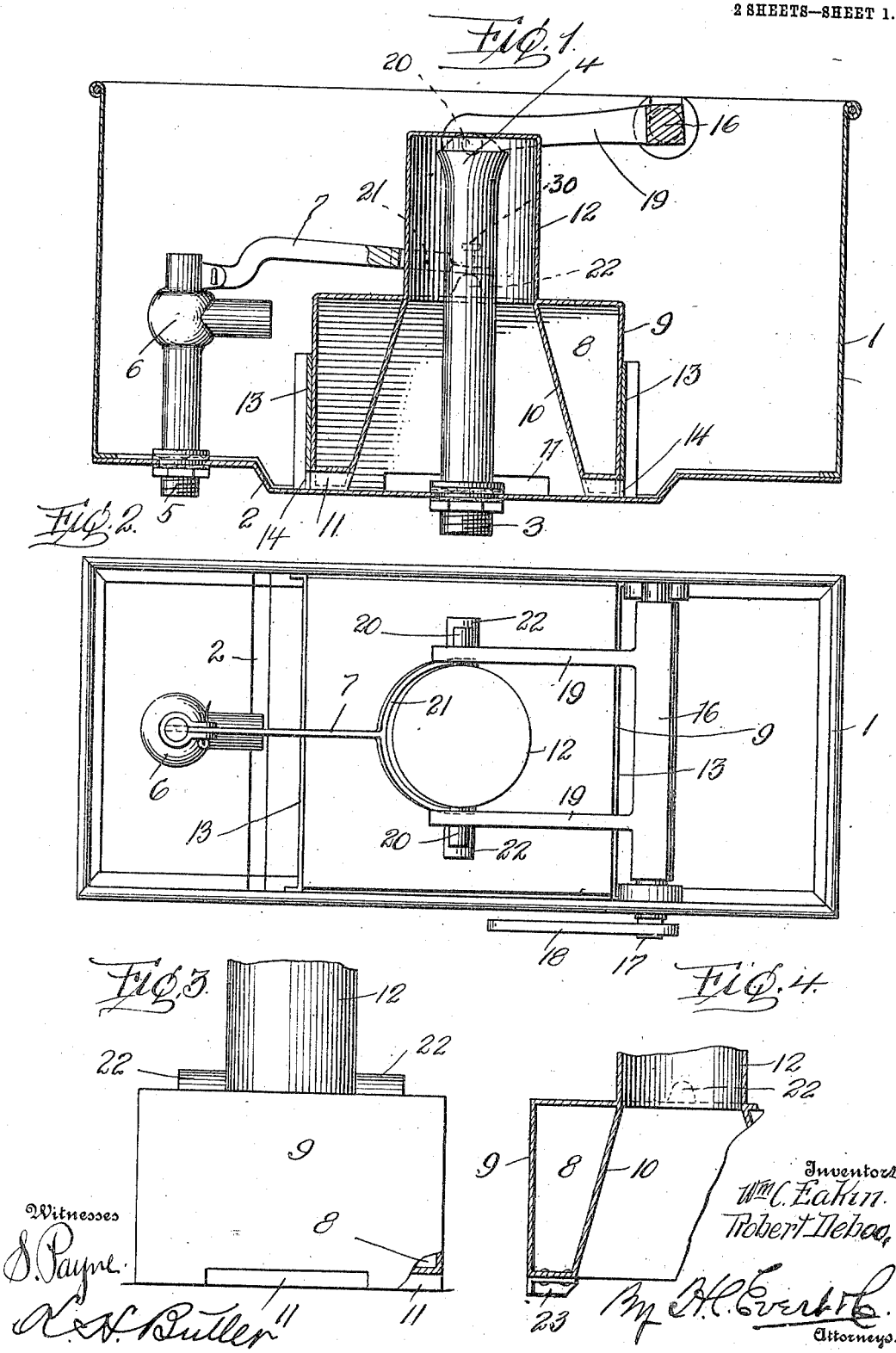

UNITED STATES PATENT OFFICE.

WILLIAM C. EAKIN AND ROBERT DEBOO, OF PITTSBURG, PENNSYLVANIA, ASSIGNORS OF ONE-EIGHTH TO JOHN ALVIN SEILER AND ONE-EIGHTH TO JOHN P. GLANNON, OF PITTSBURG, PENNSYLVANIA.

FLUSHING-TANK.

951,758.   Specification of Letters Patent.   Patented Mar. 8, 1910.

Application filed July 29, 1908. Serial No. 445,867.

*To all whom it may concern:*

Be it known that we, WILLIAM C. EAKIN and ROBERT DEBOO, citizens of the United States of America, residing at Pittsburg, in the county of Allegheny and State of Pennsylvania, have invented certain new and useful Improvements in Flushing-Tanks, of which the following is a specification, reference being had therein to the accompanying drawing.

This invention relates to flushing tanks designed for flushing closets, hoppers and bowls.

The object of the invention is to provide a simple and inexpensive valve for controlling the outlet of the tank and which can be used either independently of the inlet valve or serve as a float to actuate the inlet valve.

A further object of the invention is to provide means whereby approximately the entire contents of the tank is removed in flushing.

A further object is to provide a flushing valve of simple construction by means of which the siphonic action is freely established and cut off with certainty.

The invention comprises the construction and arrangement of parts hereinafter described and claimed.

In the accompanying drawings Figure 1 is a longitudinal sectional view of the tank showing the parts in the position they assume when the tank is empty; Fig. 2 is a plan view of the same; Fig. 3 is an elevation of a portion of the float valve; Fig. 4 is a sectional detail view of a slightly modified form of float valve; Fig. 5 is a plan view of a modified form of tank; Fig. 6 is a longitudinal vertical section through the same; Fig. 7 is a transverse vertical section through the same; Fig. 8 is a perspective view of the valve actuating means; and Fig. 9 is a detail view of the means for adjusting the float lever.

In the drawings 1 designates the tank, which may be of any suitable shape and constructed of any suitable material, being shown as rectangular in form and constructed of metal. The bottom of the tank may be provided centrally with a depressed portion 2, and secured in an opening centrally of said depressed portion is the vertical outlet pipe 3 which extends upwardly toward the top of the tank to such height that its upper end is above the normal level of water contained in the tank. Preferably the top of this pipe is flared as shown at 4.

At 5 is shown the inlet pipe provided with an inlet valve 6 which is controlled by a float lever 7. The inlet pipe and valve may be of any suitable form.

The outlet valve is in the form of a hood, or inverted cup, located over and around the outlet pipe. As shown in Figs. 1–5 the valve comprises a box-like structure 8, of square or rectangular form in plan view, provided with exterior vertical walls 9 and inclined or downwardly flaring interior walls 10, the lower edges of said walls being recessed or cut away as shown at 11 on two opposite sides of the box-like structure. This box-like structure supports the hood proper 12 located over the upper end of the outlet pipe, and being practically a continuation of the interior walls 10 of the box-like structure, the space in said hood communicating freely with the space in said box-like structure. In the preferred form the valve is so constructed as to be buoyant so that functionally it serves both as an outlet valve and as a float for actuating the inlet valve. The buoyancy may be secured in any suitable way, but preferably by inclosing the space between the exterior walls 9 and interior walls 10 so forming a hollow float which takes the place of the ball float ordinarily employed.

The valve described is guided vertically by walls or partitions 13 shown as extending transversely of the tank and contacting with the vertical walls 9 of the float valve. The walls or partitions 13 are provided at their lower edges with restricted openings 14 forming communication between the space inside the float valve and the main body of the tank. The valve is actuated by depressing the same and a convenient means for this comprises a shaft 16 journaled in the side walls of the tank and provided with a square end 17 for receiving an arm 18 or other operating means. The shaft 16 is provided with arms 19 whose outer ends are connected to, or contact with, oppositely disposed trunnions 20 carried by the hood 12. The float valve may be operatively connected to the float lever 7 by various means, the drawings showing the lever 7 forked and with the arms 21 thereof arranged to contact with lugs or bosses 22 provided on the box-like structure 8. In order to adjust the opening and closing positions of the inlet valve set screws 30 are threaded through the arms of the valve lever and contact with the lugs or bosses 22. The space inside of the float valve, that is, within the hood 12 and between the walls 10, is entirely free from obstruction, and said interior space in horizontal section is of larger area than the openings 14 in the partitions 13. When the tank is full the float valve will be in elevated position (not shown), thus holding the inlet valve 6 closed. In this position the water level is somewhat below the top of the outlet pipe. In order to flush the tank, shaft 16 is rocked to force the float valve downwardly between the partitions 13. Since the openings 14 in said partitions are of comparatively restricted area the water within the float valve which is displaced by the downward movement of the valve cannot escape through said openings sufficiently rapidly and therefore the water level within the float valve is temporarily raised above the top of the outlet pipe. The latter becomes sealed by the water entering the same, and as said water flows downwardly through said pipe it sets up siphonic action which draws the water out of the tank, the water of the main body of the tank flowing through the openings 14 in the partitions 13 and thence upwardly in the float valve and down through the pipe 3. Since the interior of the float valve is entirely unobstructed the siphonic action is rapidly formed when the valve is depressed. The siphonic action continues until the level of the water drops below the upper edges of openings 11 and 14 after which air is permitted to enter and breaks the siphonic action. Consequently the tank will be drained of its entire contents with the exception of the water contained in the depressed portion 2.

In Fig. 4 is shown a modification wherein the float valve instead of being provided with the cut away portions 11 is provided with feet or lugs 23 which serve to hold the body of said valve above the bottom of the tank and give the same effect as though the valve were provided with cut away portions.

Figs. 5, 6 and 7 show a modification in which the exterior walls 9 of the float valve are omitted. In this modification the valve is not buoyant and an independent ball float 25 is provided on the lever 7 of the inlet valve. In this modification the hood valve normally remains in its lowermost position and in order to actuate the same it is necessary to first lift the same and then permit it to drop, thereby causing the water within the same to overflow the outlet pipe and set up siphonic action. In order to deaden the noise when this valve strikes the bottom of the tank it is provided with cushions 24.

The hood valves described are shown as formed of sheet metal, and while this is preferred, we wish it understood that the invention is not limited thereto, as said valves may be formed of any suitable durable material. For convenience and cheapness of construction the square or rectangular form of valve shown is preferred, as it can be constructed with a minimum waste of material and also enables the use of simple straight partitions extending across the tank from side to side. Certain features of our invention however, are not limited in this particular but are equally as well adapted to float valves of circular or other form and with confining and guiding walls of similar form.

What we claim is:

1. Flushing tank apparatus comprising a tank, a vertically extending outlet pipe in in said tank, transverse partitions secured in the tank on opposite sides of the outlet pipe and extending between the side walls of the tank, said partitions each having an elongated opening at their lower edges, a hood-valve located over said outlet pipe, said valve having an upper cylindrical portion closed at its upper end, and a lower portion flaring outwardly interiorly and exteriorly having vertically extending walls adapted to bear against the said partitions and the opposing side walls of the tank, said vertically extending walls having openings at their lower edges, the space between the flaring walls and the outlet pipe being free from obstructions and of an area, in horizontal section, greater than the area of the openings in the partitions, and means for imparting vertical movement to the valve relatively to the partitions, said partitions and the side walls forming guides for the valve during such vertical movement.

2. Flushing apparatus comprising a tank, a vertically extending outlet pipe in said tank, transverse partitions secured in the tank on opposite sides of the outlet pipe and extending between the side walls of the tank and forming guides, said partitions having openings at their lower edges, a float valve arranged between said guides, said valve having vertical exterior walls and outwardly flaring interior walls with a superimposed hood located over said outlet pipe, said walls having openings along their free edges, and means for imparting a vertical movement to said float valve relatively to said guides.

3. Flushing apparatus comprising a tank, a vertically extending outlet pipe in said tank, an inlet pipe, a valve therein, a lever for actuating said valve, transverse partitions secured in the tank on opposite sides of the outlet pipe and extending between the side walls of the tank, said partitions having openings at their lower edges, a float valve located over said outlet pipe and adapted to actuate the lever of said inlet valve, said float valve comprising a box-like structure having a superimposed hood, the lower edges of said box-like structure being cut away to establish communication between said box-like structure and said tank, and means for imparting a vertical movement to the float valve relatively to the partitions, said partitions and side walls forming guides for the valve during such vertical movement.

4. Flushing apparatus comprising a tank provided in its bottom with a depressed portion, and outlet pipe located centrally of said depressed portion and extending upwardly in the tank, a hood valve located over said outlet pipe, partitions or walls serving to guide said hood valve and provided at their bottom edges with restricted openings, said hood valve being of buoyant construction, an inlet valve lever connected to said buoyant valve, and means arranged to depress said valve.

5. Flushing apparatus comprising a tank, an outlet pipe extending upwardly from an opening in said tank, a hollow buoyant structure provided with a hood or inverted cup located above the outlet pipe, an inlet valve lever connected to said buoyant structure, walls or partitions guiding said buoyant structure and provided with restricted openings at their lower edges, and operating means arranged to depress said valve.

6. Flushing apparatus comprising a tank, a vertical outlet pipe extending upwardly from an opening in said tank, an inverted cup or hood valve located over said outlet pipe, partitions or walls arranged to guide said valve and provided with restricted openings at their lower edges, said valve being of buoyant construction, an inlet valve lever connected to said buoyant valve, and means arranged to depress said valve.

7. Flushing apparatus comprising a tank, a vertical outlet pipe extending upwardly from an opening in the tank, and outlet valve comprising a hollow buoyant body carrying a hood or inverted cup located over said outlet pipe, partitions or walls guiding said buoyant structure and providing restricted openings at their lower edges, an inlet valve lever connected to said buoyant body, and means arranged to depress said valve.

8. Flushing apparatus comprising a tank, a vertical outlet pipe extending from an opening in said tank, transverse partitions in the tank and providing restricted openings at their lower edges, an inverted cup or hood valve located over the outlet pipe and provided with vertical portions guided by said transverse partitions and flaring toward its lower end, said valve being provided with cut away portions at the lower end registering with the openings in the partitions and having an unobstructed interior and means for actuating said valve.

In testimony whereof we affix our signatures in the presence of two witnesses.

WILLIAM C. EAKIN.
ROBERT DEBOO.

Witnesses:
MAX H. SROLOVITZ,
K. H. BUTLER.